US012602551B2

(12) United States Patent
Dube et al.

(10) Patent No.: US 12,602,551 B2
(45) Date of Patent: Apr. 14, 2026

(54) GENERATION OF SYNTHETIC DOCUMENTS FOR DATA AUGMENTATION

(71) Applicant: International Business Machines Corporation, Armonk, NY (US)

(72) Inventors: Parijat Dube, Yorktown Heights, NY (US); Vatche Isahagian, Belmont, MA (US); Prabhat Maddikunta Reddy, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 18/401,768

(22) Filed: Jan. 2, 2024

(65) Prior Publication Data

US 2025/0217601 A1 Jul. 3, 2025

(51) Int. Cl.
*G06F 40/40* (2020.01)
*G06F 40/205* (2020.01)
(Continued)

(52) U.S. Cl.
CPC ............ *G06F 40/40* (2020.01); *G06F 40/205* (2020.01); *G06F 40/295* (2020.01); *G06V 30/10* (2022.01)

(58) Field of Classification Search
CPC ....... G06F 40/40; G06F 40/205; G06F 40/295
See application file for complete search history.

(56) References Cited

U.S. PATENT DOCUMENTS 7,965,891 B2 6/2011 Handley
2004/0225571 A1 11/2004 Urali
(Continued)

FOREIGN PATENT DOCUMENTS

CN 103377403 B 12/2016
CN 112836046 A 5/2021
(Continued)

OTHER PUBLICATIONS

Carr, Andrew, "Diffusion models for document synthesis", Gretel.ai Blog, May 19, 2022, 7 Pages.
(Continued)

*Primary Examiner* — Bryan S Blankenagel
(74) *Attorney, Agent, or Firm* — Anthony M. Pallone

(57) ABSTRACT

According to one embodiment, a method, computer system, and computer program product for generating synthetic business documents for data augmentation is provided. The embodiment may include identifying a first set of key value pairs (KVPs) within a set of business documents spanning multiple domains. The embodiment may include creating domain-agnostic models of spatial distribution and content distribution of KVPs within the set. The embodiment may include grounding the domain-agnostic models of spatial distribution and content distribution using a second set of domain-specific KVPs to derive domain-specific models of spatial distribution and content distribution of KVPs within the second set. The embodiment may include generating a set of synthetic domain-specific business documents using the derived domain-specific models of spatial distribution and content distribution. The embodiment may include augmenting a training data set of a large language model (LLM) with the set of synthetic domain-specific business documents.

18 Claims, 2 Drawing Sheets

(51) Int. Cl.
 *G06F 40/295* (2020.01)
 *G06V 30/10* (2022.01)

(56) References Cited

U.S. PATENT DOCUMENTS

| | | | | |
|---|---|---|---|---|
| 2014/0280375 | A1* | 9/2014 | Rawson | G06F 16/21 |
| | | | | 707/803 |
| 2025/0036690 | A1* | 1/2025 | Nath | G06F 16/906 |
| 2025/0117833 | A1* | 4/2025 | Sahu | G06F 40/174 |

FOREIGN PATENT DOCUMENTS

| | | |
|---|---|---|
| CN | 113255294 B | 10/2021 |
| CN | 114611950 A | 6/2022 |
| CN | 114971524 A | 8/2022 |
| CN | 116361298 B | 8/2023 |

OTHER PUBLICATIONS

Indahyanti et al., "Auto-Generating Business Process Model From Heterogeneous Documents: A Comprehensive Literature Survey", IEEE, 2022 9th International Conference on Electrical Engineering, Computer Science and Informatics (EECSI2022), Oct. 6-7, 2022, 5 Pages.

Liu et al., "Graph Convolution for Multimodal Information Extraction from Visually Rich Documents", arXiv:1903.11279v1 [cs.IR], Mar. 27, 2019, 8 Pages.

Majumder et al., "Representation Learning for Information Extraction from Form-like Documents", Proceedings of the 58th Annual Meeting of the Association for Computational Linguistics, Jul. 5-10, 2020, 10 Pages.

Sage et al., "Recurrent Neural Network Approach for Table Field Extraction in Business Documents", IEEE, 2019 International Conference on Document Analysis and Recognition (ICDAR), 2019, 6 Pages.

Zewe, Adam, "In machine learning, synthetic data can offer real performance improvements", MIT News Office, Massachusetts Institute of Technology, Cambridge, MA, USA, Nov. 3, 2022, 6 Pages.

Raman et al., "Synthetic Document Generator for Annotation-free Layout Recognition", arXiv:2111.06016v3 [cs.CV], Jul. 24, 2022, 21 pages.

Xie et al., "An Augmentation Strategy for Visually Rich Documents", arXiv:2212.10047v2 [cs.CL], Dec. 22, 2022, 9 pages.

* cited by examiner

100

GENERATION OF SYNTHETIC DOCUMENTS FOR DATA AUGMENTATION

BACKGROUND

The present invention relates generally to the field of computing, and more particularly to synthetic data generation for large machine learning models.

Synthetic data is information that is artificially generated rather than produced by real-world events. Although such information does not originate from actual measurements or observations, it may nevertheless mimic real-world data. Synthetic data is typically generated using mathematical models, algorithms, or other data generation techniques and may be used as a stand-in for test data sets of production or operational data, to validate mathematical models and to train machine learning (ML) models. The generation of synthetic data may be advantageous for addressing data privacy concerns, enhancing data analysis, and enabling various applications (e.g., ML algorithms) that require large amounts of training data that accurately depicts real-world data. Additionally, synthetic data may be used to augment real-world data for ML model training when dealing with imbalanced datasets or situations where there is a shortage of real-world data.

SUMMARY

According to one embodiment, a method, computer system, and computer program product for generating synthetic business documents for data augmentation is provided. The embodiment may include identifying a first set of key value pairs (KVPs) within a set of business documents spanning multiple domains. The embodiment may include creating a domain-agnostic model of spatial distribution of KVPs within the set. The embodiment may include creating a domain-agnostic model of content distribution of KVPs within the set. The embodiment may include grounding the domain-agnostic model of spatial distribution and the domain-agnostic model of content distribution using a second set of domain-specific KVPs to derive domain-specific models of spatial distribution and content distribution of KVPs within the second set. The embodiment may include generating a set of synthetic domain-specific business documents using the derived domain-specific models of spatial distribution and content distribution. The embodiment may include augmenting a training data set of a large language model (LLM) with the set of synthetic domain-specific business documents.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
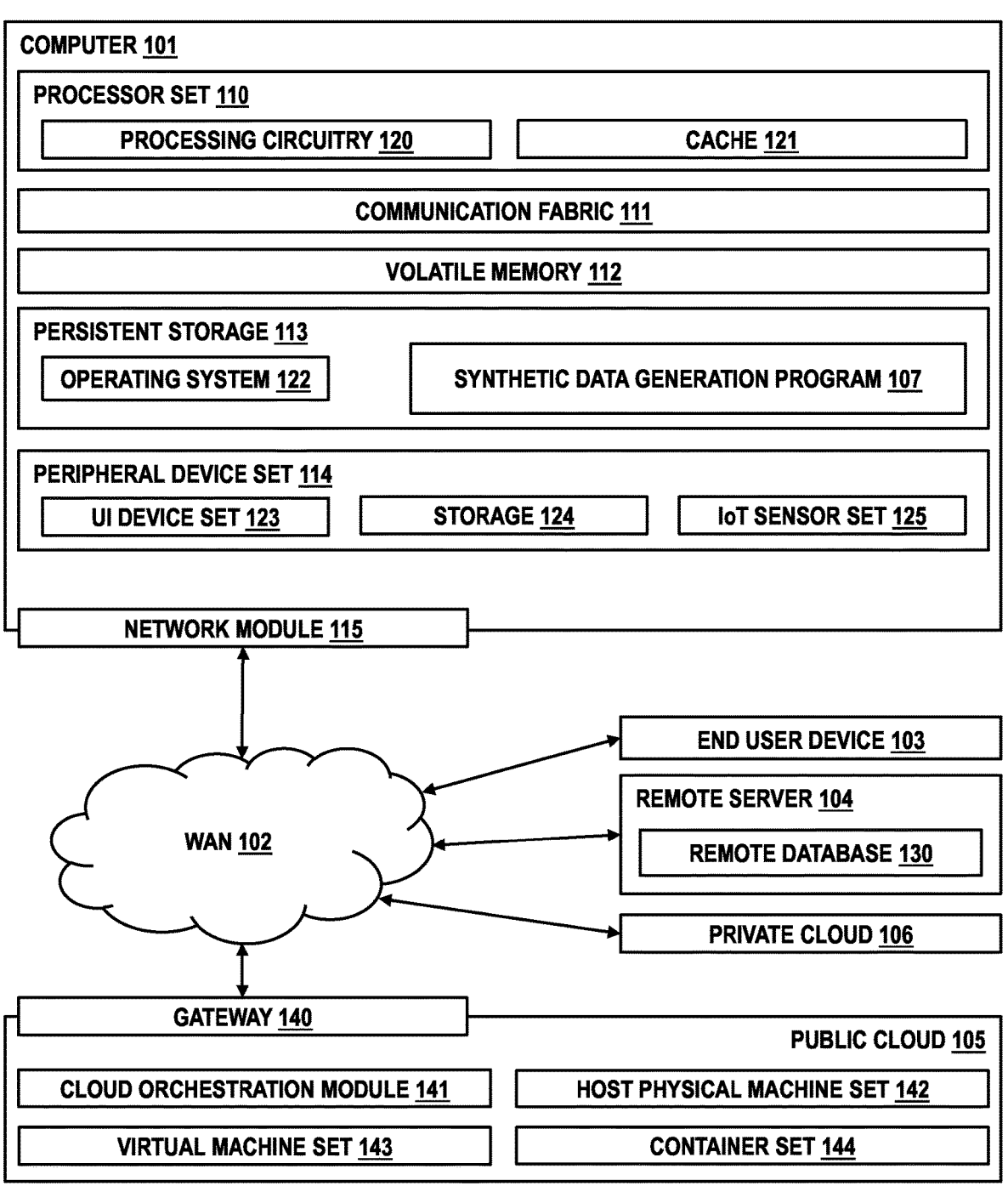
FIG. 1 illustrates an exemplary computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to synthetic data generation. The following described exemplary embodiments provide a system, method, and program product to, among other things, generate synthetic business documents for use in training a large language model. Therefore, the present embodiment has the capacity to improve the technical fields of synthetic data generation and machine learning model training by dynamically generating synthetic machine learning model training data based on spatial analysis of existing data, thus augmenting available real-world data for machine learning model training and mitigating training data scarcity.

As previously described, synthetic data is information that is artificially generated rather than produced by real-world events. Although such information does not originate from actual measurements or observations, it may nevertheless mimic real-world data. Synthetic data is typically generated using mathematical models, algorithms, or other data generation techniques and may be used as a stand-in for test data sets of production or operational data, to validate mathematical models and to train machine learning (ML) models. The generation of synthetic data may be advantageous for addressing data privacy concerns, enhancing data analysis, and enabling various applications (e.g., ML algorithms) that require large amounts of training data that accurately depicts real-world data. Additionally, synthetic data may be used to augment real-world data for ML model training when dealing with imbalanced datasets or situations where there is a shortage of real-world data.

For example, in the context of a large language model (LLM) used for document understanding tasks, such an LLM may require training on a massive amount of text data to accurately perform document understanding tasks such as information extraction, content classification, sentiment analysis, and summarization within a particular domain. While ample amounts of required training data (e.g., domain-specific documents) may be available within some domains, in other domains an amount of available training data may be insufficient for training of an LLM to perform domain-specific document understanding tasks. Consequently, in those domains where the amount of available domain-specific training data is limited, accuracy of a trained LLM in performance of document understanding tasks may be adversely affected. It may therefore be imperative to have a synthetic business document generation system in place to augment available training data via generation of synthetic domain-specific text data (e.g., business documents) for training of an LLM to perform domain-specific document understanding tasks. Thus, embodiments of the present invention may be advantageous to, among other things, receive a set of annotated business documents across multiple domains, create domain-agnostic models of spatial distributions and content distributions of key value pairs (KVPs) (e.g., text fields with corresponding values) within business documents across multiple domains, derive domain-specific models of spatial distributions and content distributions of KVPs using created domain-agnostic models of spatial distributions and content distributions, synthesize domain-specific business documents (e.g., pdf images, jpeg images) by sampling locations and content of KVPs of learned domain-specific models of spatial distributions and content distributions, and train an LLM for document understanding using synthesized business documents. The present invention does not require that all advantages need to be incorporated into every embodiment of the invention.

According to at least one embodiment, a synthetic data generation program may access or receive a set of real-world data (e.g., a set of business documents) which span multiple domains (i.e., multiple industries). The synthetic data generation program may utilize a multivariate Gaussian distribution to create a domain-agnostic model of spatial distribution of different KVPs (i.e., fields with corresponding values) within the set of real-world business documents spanning multiple domains. Additionally, the synthetic data generation program may create a domain-agnostic model of content (i.e., structure and semantics) distribution of the different KVPs. According to at least one embodiment, the synthetic data generation program may train the created domain-agnostic models of spatial and content distributions of the different KVPs to derive domain-specific models of spatial and content distributions of a subset of the different KVPs. According to at least one embodiment, the synthetic data generation program may synthesize domain-specific business documents using the derived domain-specific models of spatial and content distributions of the subset of the different KVPs. Finally, the synthetic data generation program may utilize the synthesized domain-specific business documents to train an LLM for performance of document understanding tasks within a specified domain.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to generate synthetic business documents for training data augmentation.

Referring to FIG. 1, an exemplary computing environment 100 is depicted, according to at least one embodiment. Computing environment 100 contains an example of an environment for the execution of at least some of the computer code involved in performing the inventive methods, such as synthetic data generation (SDG) program 107. In addition to SDG program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and SDG program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, such as SDG program 107, and accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative prox- imity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the meth- ods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in SDG program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located exter- nally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in SDG program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even con- nections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where com- puter 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermom- eter, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer soft- ware, hardware, and firmware that allows computer 101 to communicate with other computers through WAN 102. Network module 115 may include hardware, such as modems or Wi-Fi signal transceivers, software for packetiz- ing and/or de-packetizing data for communication network transmission, and/or web browser software for communi- cating data over the internet. In some embodiments, network control functions and network forwarding functions of net- work module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable pro- gram instructions for performing the inventive methods can typically be downloaded to computer 101 from an external computer or external storage device through a network adapter card or network interface included in network mod- ule 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with com- puter 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on. According to at least one other embodiment, in addition to taking any of the forms discussed above with computer 101, EUD 103 may further be an edge device capable of connecting to computer 101 via WAN 102 and network module 115 and capable of receiving instructions from SDG program 107.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The SDG program 107 may be a program capable of receiving a set of annotated business documents across multiple domains, creating domain-agnostic models of spatial distributions and content distributions of key value pairs (KVPs) (e.g., text/number fields with corresponding values) within business documents across multiple domains, using a multivariate Gaussian distribution to model spatial distribution of different fields in a business document, implementing template-based generation of values for different keys (e.g., text/number fields), deriving domain-specific models of spatial distributions and content distributions of KVPs using created domain-agnostic models of spatial distributions and content distributions, deriving a domain-specific grounded/trained multivariate Gaussian distribution model of spatial distribution of keys based on domain-specific keys, synthesizing domain-specific business documents (e.g., pdf images, jpeg images) by sampling locations and content of KVPs of learned domain-specific models of spatial distributions and content distributions, programmatically generating content (i.e., values) for keys of synthesized domain-specific business documents based on learned rules and/or patterns, augmenting a domain-specific training data set using synthesized domain-specific business documents, and training an LLM for document understanding using a domain-specific training data set augmented with synthesized business documents. In at least one embodiment, SDG program 107 may require a user to opt-in to system usage upon opening or installation of SDG program 107. Notwithstanding depiction in computer 101, SDG program 107 may be stored in and/or executed by, individually or in any combination, end user device 103, remote server 104, public cloud 105, and private cloud 106 so that functionality may be separated among the devices. The synthetic data generation method is explained in further detail below with respect to FIG. 2.

Figure 2:
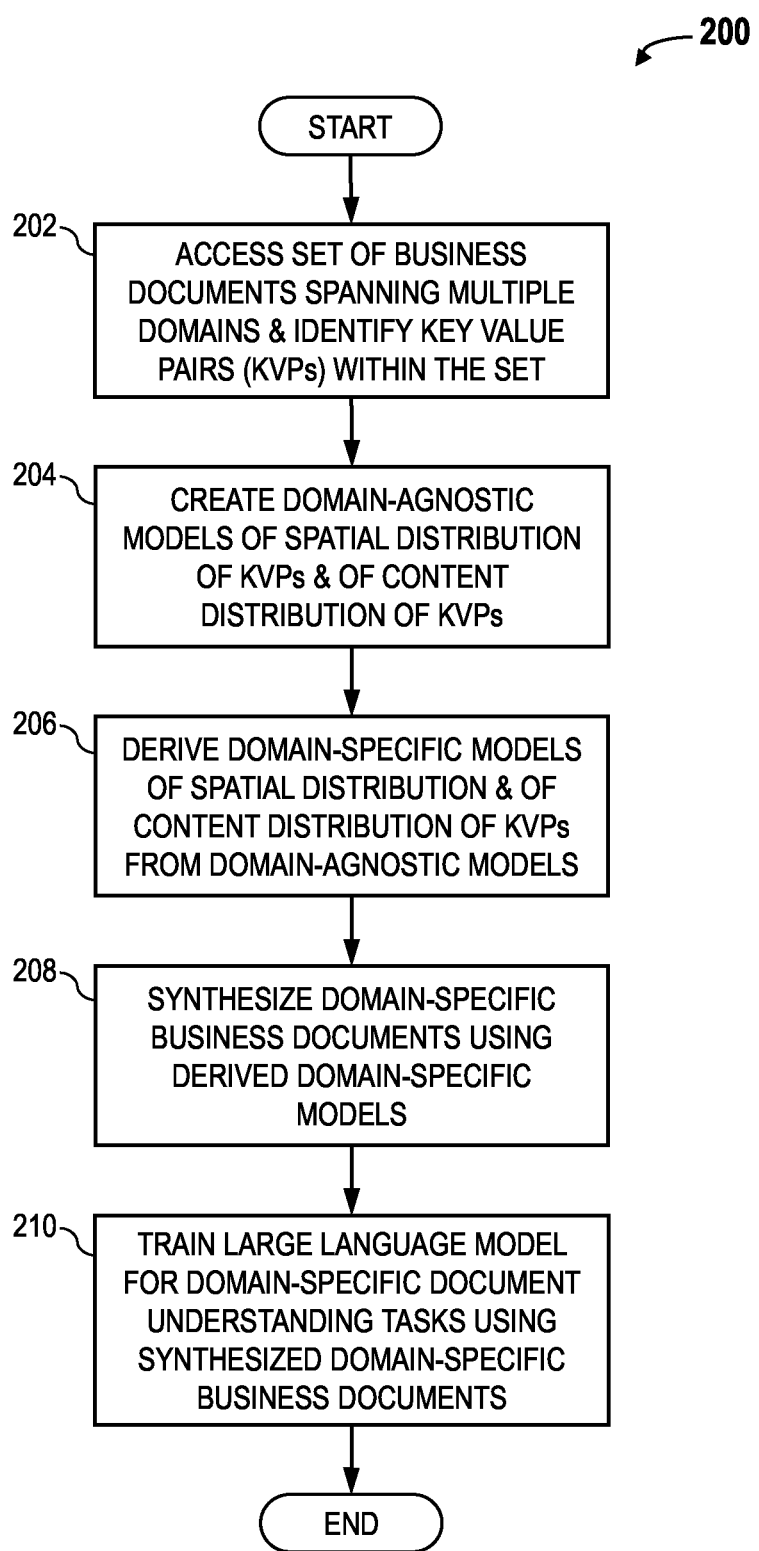
FIG. 2 illustrates an operational flowchart for generating synthetic data for machine learning model training via a synthetic data generation process according to at least one embodiment.

Referring now to FIG. 2, an operational flowchart for generating synthetic data for machine learning model training via an edge application deployment process 200 is depicted according to at least one embodiment. At 202, SDG program 107 accesses a set of business documents which includes documents from multiple domains (i.e., multiple industries) having respective domain-specific information. According to at least one embodiment, SDG program 107 may retrieve the set of business documents from the internet. According to at least one other embodiment, the set of business documents may be stored within storage 124 and/or remote database 130 and may be accessible by SDG program 107. Also, at 202, SDG program 107 may parse the set of business documents to identify key value pairs (KVPs) within the document set. According to at least one embodiment, KVPs may include fields (e.g., text boxes) within the set of business documents and their respectively contained content. For example, a key within a document may be "Address" and its paired value may be "123 Xyz Street". In parsing the set of business documents, SDG program 107 may utilize known techniques of KVP extraction such as, but not limited to, optical character recognition (OCR), intelligent character recognition (ICR), and/or named entity recognition (NER) to process the documents of the set and identify a set of KVPs across the multiple domains represented by the set of documents. Furthermore, SDG program 107 may categorize KVPs of the set according to different types. According to at least one embodiment, the set of identified and extracted KVPs may be stored within storage 124 and/or remote database 130 and may be accessible by SDG program 107.

Next, at 204, SDG program 107 creates a domain-agnostic model of the spatial distribution (e.g., the positioning/placement) of different identified KVPs within the set of business documents, as well as a domain-agnostic model of the content distribution (e.g., the structure and semantics of content) of the different KVPs. In at least one embodiment, for business documents of the set, SDG program 107 may utilize multivariate Gaussian distributions to model the spatial distributions of different fields (i.e., keys) within the business documents. For example, in the context of a given business document of the set, P may represent the number of keys (i.e., the set of keys) within the document, and $X\_p$ may represent the position of a key p (e.g., a text box) within the document. The $X\_p$ of a key p may be a vector with four elements which specify the position of a bounding box which corresponds to key p. As such, the four elements of the vector which specifies the positional coordinates of key p may include the x coordinate of a corner of key p, the y coordinate of the corner, a height value (h) from the corner, and a width (w) value from the corner. SDG program 107 may identify such a vector for every key of the set P. Furthermore, SDG program 107 may utilize standard techniques such as maximum likelihood estimation (MLE) to estimate a mean and covariance matrix of $X\_p$ for each key p of the set. The joint distribution of $\{X\_p, p=1, \ldots, P\}$ may be modeled by SDG program 107 as a multivariate Gaussian distribution. The techniques described above for modeling the spatial distributions of different keys within the context of a single business document may be aggregated by SDG program 107 to apply to the entirety, or any subset, of the set of business documents where P may represent the number of keys within the entirety, or any subset, of the set of business documents so as to enable modeling of the spatial distribution of different identified KVPs within the set of business documents.

Continuing with 204, in creating the domain-agnostic model of the content distribution (e.g., the structure and semantics of content) of the different KVPs, SDG program 107 may identify patterns of template occurrences for the different keys. Within the set of documents, the value of a key may be expressed according to different templates (i.e., different ways/styles of showing a value). For example, a value for an "Address" key may be shown in some documents according to a template which allots a single line for an address, while in other documents the value for an "Address" key may be shown according to a template which allots multiple lines for an address. As another example, a value for a "Name" key may be shown in some documents according to a template which allots a single space for a name, while in other documents the value for a "Name" key may be shown according to a template which allots multiple spaces for a name. As such, when modeling the content distribution of the different KVPs, SDG program 107 may identify, within the set of documents, structural and sematic patterns utilized for displaying values of different keys. Furthermore, SDG program 107 may define templates using rules, regex, xml, etc., based on observed patterns. The techniques described above for modeling the content distributions of different keys may be aggregated by SDG program 107 to apply to the entirety, or any subset, of the set of business documents where P may represent the number of keys within the entirety, or any subset, of the set of business documents so as to enable modeling of the content distribution of different identified KVPs within the set of business documents.

At 206, SDG program 107 derives, for a particular domain, a domain-specific model of spatial distribution and a domain-specific model of content distribution of KVPs using the domain-agnostic models created at 204. Given domain-specific information including a set of domain-specific keys, SDG program 107 may obtain new (i.e., grounded) distributions defined only over these keys. According to at least one embodiment, S may represent a subset of keys which are present in a domain D. Further, S may be a subset of the set of keys, P, present within the within the entirety (or any subset) of the set of business documents (i.e., S⊆P). Therefore, for each key s of subset S, SDG program 107 may have already calculated the mean, $\mu_S=[\mu_{s,x}, \mu_{s,y}, \mu_{s,h}, \mu_{s,w}]$, and covariance matrix, $\Sigma_s$, of position $X\_s$ of the key. As such, SDG program 107 may therefore model the domain-specific (e.g., domain D) spatial distribution of each key using a multivariate Gaussian density with mean $\mu_S$ and covariance $\Sigma_s$. Additionally, SDG program 107 may model the joint density of the S keys as a product of Gaussian density functions for each key in S where $|S|=s$ and $f(x\_1, x\_2, \ldots, x\_s)$ is the joint density of the positions of these S keys. In deriving the domain-specific model of content distribution of KVPs, SDG program 107 may refer to the created content distribution models for keys of the subset S, as S⊆P, to derive rules for semantic and structural representations of values corresponding to keys of the subset S. According to at least one embodiment, the domain-specific (e.g., domain D) information may be input to SDG program 107 by a system administrator or accessed by SDG program 107 from storage 124 and/or remote database 130. In addition to containing a set of domain-specific keys, the domain-specific information may also include a vocabulary of domain-specific content for different keys of the domain-specific keys.

Next, at 208, SDG program 107 generates synthetic domain-specific business documents using the domain-specific model of spatial distribution and the domain-specific model of content distribution derived at 206. According to at least one embodiment, in generating a synthetic domain-specific (e.g., domain D) business document, SDG program 107 may sample locations of the spatial distribution of KVPs of subset S and sample their corresponding contents (e.g., the structure and semantics of their corresponding contents) in order to generate a domain-specific business document (i.e., a business document with domain-specific keys and corresponding values). Each sample may be a collection of positional coordinates of bounding boxes of different KVPs within a layout of a document. Further, according to at least one embodiment, when sampling from the domain-specific Gaussian spatial distribution, SDG program 107 may ensure that sampled bounding boxes of different keys do not overlap or obscure each other within a layout of a generated document. SDG program 107 may achieve the non-overlap of KVPS by implementing constrained sampling from the learned/grounded multivariate Gaussian domain-specific spatial distribution. SDG program 107 may capture non-overlapping requirements as constraints when sampling so as to solve overlapping KVP layout problems during synthesis of a business document. SDG program 107 may then generate contents for the different domain-specific keys based on content patterns identified by the domain-specific model of content distribution. For example, SDG program 107 may programmatically generate domain-specific content using rules, regex, and/or xml based on template occurrences identified within subset S. It should be noted that both KVP content and non-KVP content may be generated by SDG program 107. Additionally, SDG program 107 may generate and place non-KVP information using similar methods on the same generated domain-specific documents. The position of different domain-specific keys and their corresponding values may be stored by SDG program 107 as a JavaScript Object Notation (JSON) record which may then be used for image (e.g., jpeg or pdf) synthesis/generation by SDG program 107 using standard image-generation tools.

At 210, SDG program 107 trains a large language model (LLM) for domain-specific document understanding tasks using the synthesized domain-specific business documents generated at 208. According to at least one embodiment, the synthetic data (i.e., the generated domain-specific business documents) generated by SDG program 107 may augment a training data used to train/fine-tune an LLM for performance of domain D specific document understanding tasks. As such, in situations where the training data was initially limited, the data augmentation provided by SDG program 107 may improve the performance of the LLM.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

identifying a first set of key value pairs (KVPs) within a set of business documents spanning multiple domains;

creating a domain-agnostic model of spatial distribution of KVPs within the set;

creating a domain-agnostic model of content distribution of KVPs within the set;

grounding the domain-agnostic model of spatial distribution and the domain-agnostic model of content distribution using a second set of domain-specific KVPs to derive domain-specific models of spatial distribution and content distribution of KVPs within the second set;

generating a set of synthetic domain-specific business documents using the derived domain-specific models of spatial distribution and content distribution;

augmenting a training data set of a large language model (LLM) with the set of synthetic domain-specific business documents to create an augmented training data set;

training the LLM using the augmented training data set; and performing, via the LLM, domain-specific document understanding tasks.

2. The method of claim 1, wherein identifying the first set of KVPs comprises parsing the set of business documents to extract KVPs via a technique selected from the group consisting of optical character recognition (OCR), intelligent character recognition (ICR), and named entity recognition (NER).

3. The method of claim 1, wherein spatial distributions of the KVPs of the first set and the KVPs of the second set are modeled as multivariate Gaussian distributions.

4. The method of claim 1, wherein modeling content distributions of KVPs comprises identifying structural and semantic patterns for displaying values corresponding to different keys.

5. The method of claim 1, wherein the second set of domain-specific KVPs is a subset of the first set of KVPs.

6. The method of claim 1, wherein a document of the set of synthetic domain-specific business documents is generated by sampling locations of different domain-specific KVPs from the derived domain-specific model of spatial distribution such that there is no overlap in placement of the domain-specific KVPs within the document, and wherein a location of a domain-specific KVP is represented by a vector which specifies positional coordinates of a bounding box which corresponds to the domain-specific KVP.

7. A computer system, the computer system comprising:

one or more processors, one or more computer-readable memories, one or more computer-readable storage medium, and program instructions stored on at least one of the one or more computer-readable storage medium for execution by at least one of the one or more processors via at least one of the one or more computer-readable memories, wherein the computer system is capable of performing a method comprising:

identifying a first set of key value pairs (KVPs) within a set of business documents spanning multiple domains;

creating a domain-agnostic model of spatial distribution of KVPs within the set;

creating a domain-agnostic model of content distribution of KVPs within the set;

grounding the domain-agnostic model of spatial distribution and the domain-agnostic model of content distribution using a second set of domain-specific KVPs to derive domain-specific models of spatial distribution and content distribution of KVPs within the second set;

generating a set of synthetic domain-specific business documents using the derived domain-specific models of spatial distribution and content distribution;

augmenting a training data set of a large language model (LLM) with the set of synthetic domain-specific business documents to create an augmented training data set;

training the LLM using the augmented training data set; and performing, via the LLM, domain-specific document understanding tasks.

8. The computer system of claim 7, wherein identifying the first set of KVPs comprises parsing the set of business documents to extract KVPs via a technique selected from the group consisting of optical character recognition (OCR), intelligent character recognition (ICR), and named entity recognition (NER).

9. The computer system of claim 7, wherein spatial distributions of the KVPs of the first set and the KVPs of the second set are modeled as multivariate Gaussian distributions.

10. The computer system of claim 7, wherein modeling content distributions of KVPs comprises identifying structural and semantic patterns for displaying values corresponding to different keys.

11. The computer system of claim 7, wherein the second set of domain-specific KVPs is a subset of the first set of KVPs.

12. The computer system of claim 7, wherein a document of the set of synthetic domain-specific business documents is generated by sampling locations of different domain-specific KVPs from the derived domain-specific model of spatial distribution such that there is no overlap in placement of the domain-specific KVPs within the document, and wherein a location of a domain-specific KVP is represented by a vector which specifies positional coordinates of a bounding box which corresponds to the domain-specific KVP.

13. A computer program product, the computer program product comprising:

one or more computer-readable storage medium and program instructions stored on at least one of the one or more computer-readable storage medium, the program instructions executable by a processor capable of performing a method, the method comprising:

identifying a first set of key value pairs (KVPs) within a set of business documents spanning multiple domains;

creating a domain-agnostic model of spatial distribution of KVPs within the set;

creating a domain-agnostic model of content distribution of KVPs within the set;

grounding the domain-agnostic model of spatial distribution and the domain-agnostic model of content distribution using a second set of domain-specific KVPs to derive domain-specific models of spatial distribution and content distribution of KVPs within the second set;

generating a set of synthetic domain-specific business documents using the derived domain-specific models of spatial distribution and content distribution;

augmenting a training data set of a large language model (LLM) with the set of synthetic domain-specific business documents to create an augmented training data set;

training the LLM using the augmented training data set; and performing, via the LLM, domain-specific document understanding tasks.

14. The computer program product of claim 13, wherein identifying the first set of KVPs comprises parsing the set of business documents to extract KVPs via a technique selected from the group consisting of optical character recognition (OCR), intelligent character recognition (ICR), and named entity recognition (NER).

15. The computer program product of claim 13, wherein spatial distributions of the KVPs of the first set and the KVPs of the second set are modeled as multivariate Gaussian distributions.

16. The computer program product of claim 13, wherein modeling content distributions of KVPs comprises identifying structural and semantic patterns for displaying values corresponding to different keys.

17. The computer program product of claim 13, wherein the second set of domain-specific KVPs is a subset of the first set of KVPs.

18. The computer program product of claim 13, wherein a document of the set of synthetic domain-specific business documents is generated by sampling locations of different domain-specific KVPs from the derived domain-specific model of spatial distribution such that there is no overlap in placement of the domain-specific KVPs within the document, and wherein a location of a domain-specific KVP is represented by a vector which specifies positional coordinates of a bounding box which corresponds to the domain-specific KVP.

* * * * *